though under some conditions the storage atmosphere will contain as high as 25% carbon dioxide.

United States Patent Office
3,445,240
Patented May 20, 1969

3,445,240
METHOD OF TENDERIZING MEAT
Karakian Bedrosian and Donald L. Robach, St. Joseph, Mich., assignors to Whirlpool Corporation, a corporation of Delaware
No Drawing. Filed Nov. 2, 1964, Ser. No. 408,340
Int. Cl. A22c; A23j
U.S. Cl. 99—107                    3 Claims

ABSTRACT OF THE DISCLOSURE

A method of tenderizing meat while storing it in which the meat is chilled under specified controlled conditions for a definite range of time, at a particular temperature and in contact with an atmosphere containing controlled and limited amounts of oxygen and carbon dioxide and at a specified high relative humidity range.

---

This invention relates to the storing and tenderizing of carcass meat.

It has long been known that meat can be tenderized by storing for varying periods of time during which the enzymes of the meat continue to function, post-mortem, to catalyze the hydrolysis of the various collagens and other proteins, and otherwise break down the connective tissues so that at the conclusion of the aging the meat is more tender, has more flavor and is of better and more acceptable texture to the consuming public.

Although such aging and tenderizing is desirable in improving the edibility of the meat, there are certain objectionable reactions that occur to the meat under the presently used methods of aging and tenderizing. It is well known that the natural enzymatic tenderizing can be accelerated by increasing the temperature of the meat. However, such increase in temperature also increases the dehydration and/or purge which causes shrinkage and loss of saleable weight. Also, the higher temperature increases the rate of bacteria, mold, yeast and other growth which causes considerable additional loss in the meat. Furthermore, under such conditions the fat tends to become rancid, while the molds, yeast and bacteria give an off flavor to the meat and causes discoloration which over an extended period of time may make deep sections of the meat unsaleable. A relatively high humidity may be used to reduce the dehydration of the meat. However, the rate of increase of bacteria and other growth due to the high humidity is more objectionable and costly than the losses due to dehydration.

In order to prevent excessive bacteria growth with the above damage to the meat, the commercial aging and tenderizing is done at low temperatures for long periods of time. Thus, customarily the meat and room in which it is stored are maintained at about 35° F. for as long as two weeks or more. Even at these low temperatures, however, and in relatively high humidity which is only about 80% in commercial operations, the shrinkage over this time is approximately 5–10% and the trimming waste to remove surface discoloration and spoilage is often 8–12%. These, of course, are considerable losses and the costs for this loss is of course passed on to the consumer.

The method of this invention permits storage and tenderizing primal and carcass meat at temperatures to promote enzymatic tenderizing while still inhibiting the growth of bacteria, molds, yeast and the like which, as explained above, tend to destroy the meat either wholly or in part. In the method of this invention the meat after dissipation of body heat from the carcass is maintained in an unfrozen condition for a storage period at the temperature of between about 32–65° F. in a 90–100% relative humidity atmosphere. A practical temperature range is about 45–55° F. with the meat being stored for from 4 days to 2 weeks, although storage periods of as long as 18 days have been successfully employed. At a temperature range of about 32–45° F. a storage period of about 2–4 weeks has been satisfactory. At the lower temperatures the meat is stored for the longer periods of time, and vice versa.

The meat is surrounded by an atmosphere containing an amount of oxygen effectively low to inhibit substantial bacterial growth on the meat with the remainder of the atmosphere consisting essentially of carbon dioxide and inert gas in addition to the carbon dioxide. The storage period required for tenderizing is of effective duration to permit the enzymatic tenderizing of the meat and depends upon the original tenderness of the meat, the degree of tenderness desired and the temperature at which the meat is tenderized. Temperature directly affects the action of the tenderizing enzymes and thus, the higher the temperature the shorter the tenderizing period required. In some instances, this storage period can be much shorter than that now used commercially, such as from about 2 to 4 days rather than the up to 2 weeks or more now used in the commercial low temperature tenderizing.

For most meats the tenderizing storage atmosphere will contain a maximum of about 5% by volume of oxygen and the atmosphere may be substantially oxygen free, if desired. Although it has been proposed in the past that meat be stored in an atmosphere having an amount of carbon dioxide as high as 25% by volume or more to reduce bacteria action, the method of this invention permits reducing excessive bacteria action by the use of much lower amounts of carbon dioxide in combination with the other feature of the invention. Thus, in typical instances, the amount of carbon dioxide has been between about 5–12% by volume of the atmosphere. The remainder of the atmosphere in addition to the oxygen, if any, and carbon dioxide consists essentially of inert gases. It has been found that the higher the oxygen content of the atmosphere, the higher the carbon dioxide required to produce the desired bacteria retarding effect. Also, for each oxygen level there has been found a level of carbon dioxide beyond which the rate of effectiveness of the increased carbon dioxide is much less than that below the level.

Thus, the method of this invention permits achieving rapid enzymatic tenderizing of meat by using higher temperatures. These higher temperatures, however, do not promote excessive rancidity in the fat or excessive bacterial and other growth on the meat, as these actions are inhibited by the low oxygen content of the atmosphere as well as increased carbon dioxide content, both in relation to the oxygen and carbon dioxide of ordinary air.

In one example of practicing the method of this invention a steer was slaughtered, skinned and eviscerated. The carcass was then cooled rapidly to about 35° F. for a time sufficient to remove body heat and permit rigor mortis to occur. This chilling was done rapidly in order to prevent bone sour. Primals from the carcass meat were then stored and tenderized for a period of 3 days, some at a temperature of 53° F. and others at a temperature of 60° F., and both rooms containing an atmosphere of about 1% oxygen, 12% carbon dioxide and the remainder nitrogen and other inert gases of air. This atmosphere was maintained at a relative humidity of about 95% to reduce weight loss due to dehydration but the humidity was carefully maintained low enough to prevent substantial moisture condensation on the surface of the meat.

The method of this invention is effective in tenderizing the meats of beef, pork, lamb, mutton, veal, fowl, fish and other seafood, and the like, all identified herein as "meat." The method tenderizes the meat in a relatively short time and reduces shrinkage to an unexpected degree. Thus, the method of this invention reduces shrinkage of the meat when compared to storage of identical meat in air under the same conditions of humidity and temperature and time. Thus, the nature of the atmosphere in which the meat is stored in this invention contributes in some unknown way to reducing shrinkage, even under identical conditions of humidity. The reason for this is not completely understood but is believed to be caused by the atmosphere changing the proteins' affinity for moisture. It also has been noted that the purge of such tenderized meat during cooking is lessened.

The method of this invention also reduces the growth of micro-organisms so that the meat at the end of the storage period, besides being tenderized, is relatively undamaged by bacteria and such other growths. Related to this, the method of this invention also reduces the depth that the meat is discolored as well as reduces fat rancidity. The stored meat of this invention, once shaved to remove the discolored portion, will bloom so that it has an attractive appearance to the purchaser. Also, the meat has been found to have a longer shelf life than meat similarly stored and tenderized in an atmosphere of air.

As discussed earlier, the atmosphere in which the meat is stored contains an amount of oxygen effectively low and an amount of carbon dioxide effectively high to inhibit substantial bacterial growth on the meat during the storage period with the remainder of the atmosphere consisting essentially of inert gas, such as nitrogen. Furthermore, the amounts of oxygen and carbon dioxide can be regulated to adapt the atmosphere for the most efficient storage of all types of meat. Such an atmosphere can be generated by the catalytic combustion of hydrocarbon fuels, for example, as disclosed in prior Patents 3,102,778 and 3,102,780, both assigned to the same assignee as the present application.

Having described our invention as related to the embodiment set out herein, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. The method of storing and tenderizing meat consisting essentially of rapidly chilling the meat after butchering the animal until rigor mortis, then raising the temperature and maintaining the meat for a storage period of about 2 to 18 days at a temperature of between about 45–65° F. in a surrounding bacteria containing atmosphere of about 90–100% relative humidity containing a maximum of about 5% by volume of oxygen and about 5–12% by volume of carbon dioxide, the remainder of said atmosphere consisting of nitrogen and other inert gases of air.

2. The method of storing and tenderizing meat consisting essentially of rapidly chilling the meat after butchering the animal until rigor mortis, then raising the temperature and maintaining the meat for a storage period at a temperature of between about 55–65° F. in a surrounding atmosphere of about 90–100% relative humidity containing a maximum of about 5% by volume of oxygen and between about 5–12% by volume of carbon dioxide with the remainder of said atmosphere consisting of nitrogen and other inert gases of air, and said storage period being of about 2 to 4 days to permit enzymatic tenderizing of the meat.

3. The method of storing and tenderizing meat consisting essentially of rapidly chilling the meat after butchering the animal until rigor mortis, then raising the temperature and maintaining the meat for a storage period at a temperature of between about 45–55° F. in a surrounding atmosphere of about 90–100% relative humidity containing a maximum of about 5% by volume of oxygen and between about 5–12% by volume of carbon dioxide with the remainder of said atmosphere consisting of nitrogen and other inert gases of air, and said storage period being of about 4 to 18 days to permit enzymatic tenderizing of the meat.

References Cited

UNITED STATES PATENTS

| 3,102,777 | 9/1963 | Bedrosian et al. | 99—157 X |
| 3,102,779 | 9/1963 | Brody et al. | 99—157 X |
| 3,102,780 | 9/1963 | Bedrosian et al. | |

FOREIGN PATENTS

| 430,208 | 6/1935 | Great Britain. |

HYMAN LORD, *Primary Examiner.*